July 30, 1963 M. S. SCHMOOKLER 3,099,753

THREE LEVEL LOGICAL CIRCUITS

Filed April 14, 1960 2 Sheets-Sheet 1

INVENTOR
MARTIN S. SCHMOOKLER
BY Archer S. Tenser
ATTORNEY

July 30, 1963 M. S. SCHMOOKLER 3,099,753

THREE LEVEL LOGICAL CIRCUITS

Filed April 14, 1960 2 Sheets-Sheet 2

United States Patent Office 3,099,753

Patented July 30, 1963

3,099,753

THREE LEVEL LOGICAL CIRCUITS

Martin S. Schmookler, Poughkeepsie, N.Y., assignor to International Business Machines Corporation, New York, N.Y., a corporation of New York Filed Apr. 14, 1960, Ser. No. 22,289
12 Claims. (Cl. 307—88.5)

This invention relates to logical circuitry and more particularly to improved circuitry of this type for use in digital computers.

Most present day large scale digital computers operate in a binary fashion. In this mode of operation, the binary "0" and binary "1" are represented by the absence or presence, respectively, of a given signal indication. The signal indication may take one of several forms; pulse, voltage level, or frequency. Regardless of which form used however, the indication remains uniform throughout the computer. The present invention, by introducing a third "level" or indication into the binary operation being performed in the machine, increases the versatility of the machine and at the same time effects a savings in components.

Accordingly the principal object of this machine is to provide an improved logical system.

Another object of this invention is to provide a logical system functioning in the binary mode but including a third operator whereby a saving in total circuitry to achieve a given logical result is effected.

Still another object of this invention is to provide a logical system operating in the binary mode and further including a third or "inhibit" signal indication whereby the logical power of a given circuit is increased.

Yet another object of this invention is to provide an exclusive OR circuit utilizing the above enumerated techniques.

A still further object of this invention is to provide a binary full adder utilizing the aforementioned techniques whereby a savings in total circuitry needed to achieve the function is effected.

In copending application Serial Number 622,307, filed November 15, 1956, by H. S. Yourke, entitled "Transistor Switching Circuits," now U.S. Patent 2,964,652, granted December 13, 1960, and assigned to the present assignee, there is described a system of logical circuits for use in digital computer organizations. As shown therein, transistors of both the PNP and NPN type are used in individual logical blocks composed entirely of a plurality of one type of transistor, the voltage levels of the system being such that the output of a block of one type, e.g., PNP, would be of the proper polarity and voltage swing to drive a transistor of the opposite type in a succeeding block. The operation of each of these blocks is based upon the switching of a well defined unit of current, such as from a constant current source, from one to another of several discrete current paths consisting of individual transistors. The voltage levels at the transistor load impedances in the current and no current condition of any of the individual paths define the binary "0" and binary "1" levels respectively. These voltage levels are sufficient to drive succeeding stages.

The present invention, by providing voltage levels which may be selected to be greater than the comparable levels of the system of the aforementioned application, enables an added inhibit function to be performed by the circuitry. It has been found that by use of this inhibit arrangement, the logical power that can be obtained with a given amount of circuitry is substantially increased and logical organizations can be built up to perform given operations with a substantial savings in components and speed.

The foregoing and other objects, features and advantages of the invention will be apparent from the following more particular description of preferred embodiments of the invention, as illustrated in the accompanying drawings.

Throughout the ensuing description, the Boolean algebra notation will be used. Thus, the expression: $A \cdot B$ means A "and" B; $A+B$ means A "or" B; $A \veebar B$ means A "Exclusive OR" B; a bar over an expression (e.g. $\overline{A}$) signifies the inverse or complement of the expression (not A); etc. For a more complete discussion of the Boolean system, reference may be had to the book entitled "Arithmetic Operations in Digital Computers" by R. K. Richards, copyright 1955, published by the D. Van Nostrand Co. Inc., Princeton, N.J.

Figure 1:
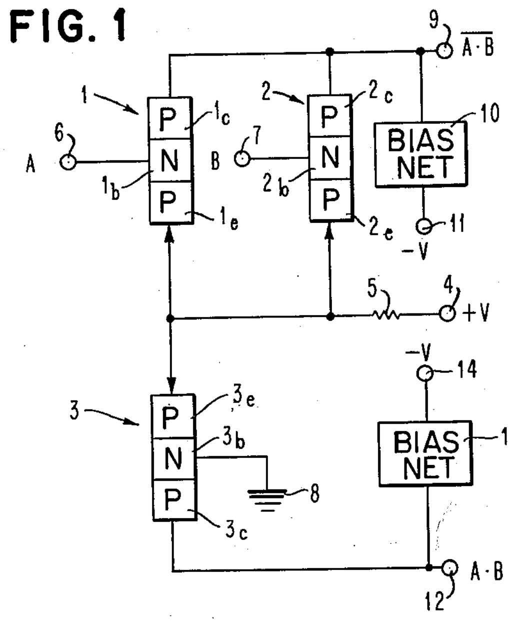
FIGURE 1 illustrates a logical circuit as described in the aforementioned application S.N. 622,307.

The circuit of FIGURE 1 is illustrative of the logical configurations described in the aforementioned copending application. The particular circuit shown is a two-way AND block utilizing PNP transistors 1, 2, and 3. Transistor 1 has its emitter 1*e*, base 1*b*, and collector 1*c*. The transistors 2 and 3 have similar elements at 2*e*, *b*, *c*, and 3*e*, *b*, *c*, respectively. The emitters of the three transistors are connected in common to one side of a resistance element 5, the other side of which is connected to positive voltage source 4. The collectors of transistors 1 and 2 are tied in common to output terminal 9 and through bias network 10 to source 11 of negative voltage. The collector of transistor 3 is tied to output terminal 12. Negative voltage source 14 is applied to the collector through the bias network 13. Input terminals 6 and 7 are provided for supplying input signals to the bases of the transistors 1 and 2 respectively. The base of transistor 3 is tied directly to a fixed reference potential 8, in this case ground.

In considering the operation of this circuit, a positive logic convention is followed. That is, a binary "1" is always represented by the more positive of two voltages that may appear at a point in the circuit, while the binary "0" is always indicated by the more negative of the signal levels. As will be seen more clearly hereinafter, this is true regardless of the state of conductivity of the particular transistor under consideration.

The voltage source 4 and resistor 5 are so proportioned that they constitute a constant current source which will provide a fixed amount of current to the common emitter node of the transistors. Assuming initially that both input signals A and B are at their binary "1" conditions, i.e., are at their more positive levels, these inputs are sufficient to reverse bias both the transistors 1 and 2 and maintain them nonconducting. The base of transistor 3, however, is tied to ground potential which is negative with respect to the common emitter node and thus the transistor 3 will be forward biased and conducting. In accordance with well known transistor theory, when conducting, the collector of the PNP transistor will rise to approximately that potential present at its emitter terminal. Thus the voltage level at output terminal 12 will rise. In accordance with the convention, this upper voltage level at terminal 12 signifies a binary "1" which, when related to the input conditions, indicates that this terminal will show the logical function $A \cdot B$. At terminal 9 there will appear a logical "0" since neither transistors 1 and 2 are conducting and the voltage at the terminal will be the negative collector voltage of the transistor in its Off condition. The terminal will then show the inverse or complement of the logical function: $\overline{A \cdot B}$.

Figure 3:
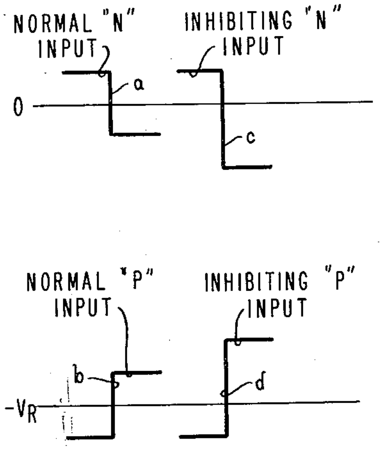
FIGURE 3 is a series of wave forms useful in understanding the operations of FIGURES 1 and 2.

Referring now to the curves of FIG. 3, curve *a* illustrates the input signal levels such as would be applied to a PNP transistor as shown in FIG. 1. As can be seen, this signal varies from its "1" condition at a voltage positive with respect to ground to its "0" position which is a voltage negative with respect to ground. Consequently, when both inputs A and B of FIG. 1 are at their "1" condition, the base of transistor 3 is biased more negatively than either of transistors 1 and 2 and therefore will conduct all the current from source 4, 5. Assuming now that input signals A or B or both fall to their logical "0" condition, it will be seen that the base voltage at their respective transistors will be negative with respect to ground and therefore more negative than the base of transistor 3. As a result, all of the current from the constant current source will now flow through either or both of transistors 1 and 2 and the potential at terminal 9 will rise. Since transistor 3 is now cut off, the potential at output terminal 12 will fall to the collector bias potential. This is a logical "0," signifying that the AND function of the circuit has *not* been achieved. The logical "1" now present at terminal 9 signifies that the complement of the circuit function is present. As can be seen from the above described circuit and as explained more fully in the aforementioned copending application, this circuit depends for its operation on the fact that the transistor that is biased most heavily into conduction will conduct all of the current available from the constant current source. Since the collectors of transistors 1 and 2 are connected in common, it is immaterial whether or not the signal levels of A and B are identical. The bias networks 10 and 13 are so designed that the voltage swings appearing at the output terminals 9 and 12 respectively, vary about a fixed reference level the same amount as the input signals A and B. It will be apparent however, from consideration of the operation of the transistors, that while the ouput voltage swings may be controlled to be the same as the input voltage swings, the reference levels about which they vary will be different. Thus, while the input signals A and B, for example, may vary on either side of 0 or ground potential, the output voltages at terminals 9 and 12 will vary about some negative reference level, $-V_R$ (see FIGURE 3). As will be seen more clearly in the foregoing discussion, the reference level at the output terminals of the block composed of PNP transistors is of the proper value to control the transistors of a similar block composed of NPN transistors.

It will be understood that in the NPN block, the collector voltage sources 11 and 14 will be positive with respect to the emitter voltage source 4, in accordance with well known NPN transistor operation. Upon conduction of an NPN transistor, its collector voltage falls, i.e., goes towards its more negative level. Thus, an NPN transistor provides a logical "1" output in its non-conducting state and a "0" when conducting. Therefore, such an NPN block, while operating in a fashion similar to the PNP block above described, performs the OR function. A typical input to the transistor of such an NPN block is shown as curve *b* in FIGURE 3. For simplicity in discussing these two types of logical blocks, the PNP block is defined as being an N block, i.e., it is composed of transistors having bases of N type semiconductor material. Conversely, the NPN block will be called a P block in the ensuing description.

Figure 2:
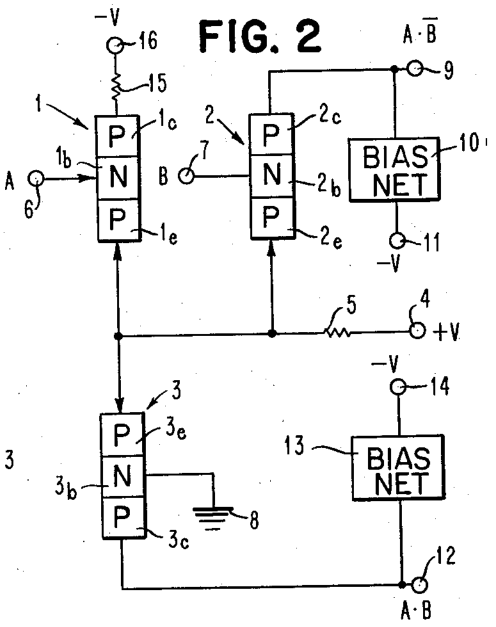
FIGURE 2 illustrates a basic logical block in accordance with the present invention.

Referring now to FIGURE 2, there is illustrated a modification of the PNP block of FIG. 1 in accordance with the present invention. As can be appreciated, this block is similar to the block of FIG. 1 and like elements thereof have the same reference numerals. The difference between the two circuits lies in the connection of the collector of the transistor 1. In the circuit of FIG. 1, both collectors 1*c* and 2*c* are connected in common and to the output terminal 9. In the circuit of the present invention, the collector of transistor 1 is connected through a separate load impedance 15 to a source of collector bias 16. Conduction of transistor 1 provides no current flow to the output terminal 9 and thus no rise in potential thereat. It will be apparent from consideration of this circuit, that if the transistor 1 is conducting, no current will flow either in transistor 2 or transistor 3 and both output terminals 9 and 12 will be at their more negative levels. Operation thus distinctively differs from that of the circuit of FIG. 1, wherein either terminal 9 or 12 is positive at all times. Should transistor 1 be held nonconducting, the operation of transistors 2 and 3 will be the same as that of FIG. 1. It will be recognized of course, that additional transistors may be paralleled with transistors 1 and 2 to extend the logical function of the block.

As discussed with respect to the circuit of FIG. 1, the transistor which is most strongly driven into conduction will absorb all of the current available from the constant current source to the exclusion of all of the other transistors in the circuit. In the circuit of FIG. 1, it was seen that it was immaterial to the logical function of the block whether A or B or both were at the "0" or negative level. In each case, the voltage at the output terminal 9 would rise to its positive level since the collectors were commoned. Assuming a normal range of tolerances on the magnitudes of the input voltage levels, it is then of no consequence if A is slightly more negative than B in its "0" state, for example. Regardless of which of the two transistors is conducting, the proper logical function is being performed. For proper operation of the circuit of FIG. 2 however, it is necessary to ensure that when desired, transistor 1 becomes conductive to the exclusion of all the remaining transistors in the circuit. This is accomplished by making the negative excursion of the input signal A to the base of the transistor 1 substantially larger than that of the signals applied to the base of the transistor 2. Thus, should both A and B be at their more negative or "0" levels, A will be considerably more negative than B and transistor 1 will conduct all of the current available from the constant current source. Transistors 2 and 3 will remain nonconducting and the output terminals 9 and 12 will stay at the negative levels. The large negative voltage provided at terminal A constitutes a third or additional voltage level with the normal "0" and "1" levels of the input signals B. This type of input signal is indicated by an arrowhead on the line from the input terminal to the base of the transistor 1 and this notation will be followed throughout the remaining discussion.

The effect of this third level or overriding input on the basic transistor block is to substantially change its logical statement. The inhibiting action of a "0" A input provides a "0" output at both terminals 9 and 12 regardless of the status of the input B. If the A input is a "1" however, the current from the constant current source will flow through either transistor 2 or transistor 3, ensuring that one or the other of terminals 9 and 12 will be at the "1" condition. If in this condition, B is a "1," transistor 2 is non-conducting and a "1" appears at the terminal 12. This can be expressed as a logical function $A \cdot B$. If B is at a "0," transistor 2 is conducting and terminal 9 is at the "1" condition, signifying the logical statement $A \cdot \overline{B}$. Comparison of these two outputs with those of the circuit of FIGURE 1 will show a difference in logical statements appearing at terminal 9. The pure AND function is available at terminal 12 in both instances. As discussed in connection with FIGURE 1, the circuit of FIGURE 2 is also realizable using NPN transistors in which case a corresponding OR function is performed. Curves *c* and *d* of FIG. 3 illustrate the relation of the additional signal levels to the normal signal levels used with this circuitry.

In the aforementioned copending application, the collector biasing network for the transistors, equivalent to the elements 10 and 13 of FIGS. 1 and 2 of the instant application, is shown as a voltage divider network from which a tap to the collector of the transistors was taken. This network comprises a pair of resistors connected in series between two voltage levels, one set of levels being used with the coupling network for the N block and a second set of levels being used with the P block. As is obvious from consideration of this network, the reference level about which the output signal of a given block will swing is determined by the levels of the two sources with respect to ground and the proportioning of the resistors, while the magnitude of the swing about this reference level is determined by the resistor values. Thus, to produce a normal output such as shown in curves *a* and *b* of FIG. 3, the voltage levels and resistors are so chosen that the output swing varies equally on both sides of the selected reference level. To produce the third level or inhibiting input such as shown in curves *c* and *d* of FIG. 3, it is necessary only to change the proportioning of the resistors so that the swing on one side of the reference level is greater than that on the other side. Simple calculations using elementary circuit theory will enable these networks to be designed and it is believed unnecessary to go into further detail here. It is sufficient to state that by proper proportioning of the components of the bias networks 10 and 13, the voltage levels at the terminals 9 and 12 can be made to provide either a normal input to a succeeding stage or an inhibiting or third level input, as desired. For example, the third level or inhibiting input A supplied to the transistor 1 in FIG. 2 may be obtained from the output of an NPN block of the type discussed in connection with FIG. 1. The third level may be generated merely by suitable proportioning of the bias network at the output line of the NPN block. It can thus be appreciated that in any logical chain, utilizing circuits of the nature of those shown in FIGS. 1 and 2, that the third level or inhibiting input can be generated within the network wherever desired merely by proper proportioning of the bias networks such as 10 and 13.

Figure 4:
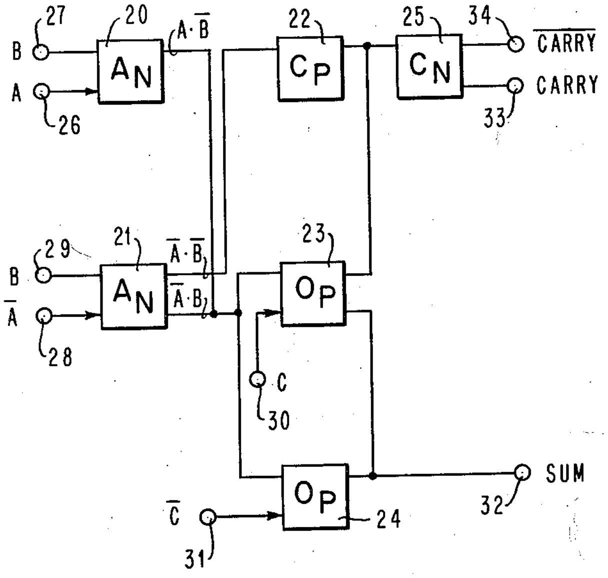
FIGURE 4 is a block diagram of a fully binary adder utilizing the present invention.

Referring now to FIG. 4, there is illustrated in block form a full binary adder constructed in accordance with the present invention. The blocks 20 and 21 are AND blocks of the type illustrated in FIG. 2. These blocks utilize transistors of the PNP type and are thus legended $A_N$ to signify an AND function being performed by an N type logic block. The input A applied to terminal 26 is of the third level or inhibit type as signified by the arrowhead affixed therto. This is equivalent to the input A of the circuit of FIG. 2. Similarly, the B input to terminal 27 is the normal input, equivalent to the B input of FIG. 2. An output of the block is taken from its upper output terminal, equivalent to the terminal 9 of FIG. 2. It is to be understood that in considering each of the logical blocks of FIG. 4, that an output line near the top of the particular block signifies the output taken from the terminal thereof equivalent to the terminal 9 of FIG. 2. Likewise an output line shown near the bottom of the block is equivalent to the output present at the terminal 12 of the circuit of FIG. 2.

To the inputs 28 and 29 of block 21 are applied the $\overline{A}$ signal and the B signal, respectively. Actually the terminals 27 and 29 may be a common point since the same signal is applied to both. The $\overline{A}$ signal applied to block 21 is a third level signal and will be positive or a logical "1" when the input signal A is a logical "0" or negative. The upper output of the block 21 indicates the logical function $\overline{A}\cdot\overline{B}$ and is connected to the normal input of the block 22. The lower output of block 21 provides the logical statement $\overline{A}\cdot B$ and is connected in common to the output of the block 20. As will be seen more clearly in connection with the discussion of FIG. 5, this common output connection of blocks 20 and 21 provides the Exclusive OR function. This output is connected to the upper inputs of blocks 23 and 24.

The block 22 is a convert block provided to invert the signal applied at its input as well as to translate it from a P line signal to an N line signal. This block comprises merely the block of FIG. 1 without the transistor 2 and utilizing NPN transistors. As will be obvious from consideration of the operation of such a circuit, the upper output of the block will provide the inverse of the signal applied to its input at a voltage level suitable for driving an N type block. The upper output of block 22 therefore, will provide the inverse of the $\overline{A}\cdot\overline{B}$ output of block 21, or $A+B$.

The blocks 23 and 24 are OR blocks, composed of NPN transistors connected in the configuration of FIG. 2. The third level input applied to terminal 30 of block 23 is the carry signal obtained from a previous adder in the system. Similarly, the third level input applied at terminal 31 of block 24 indicates the absence of a carry from the previous stage or $\overline{C}$. The upper output of the block 23, having the logical function $C+\overline{A\veebar B}$, is connected in common to the output of the convert block 22. As will become apparent in the discussion of FIG. 5, this common connection ANDs these two outputs. The lower output of block 23 is connected in common or ANDed with the upper output of block 24.

The common outputs of blocks 22 and 23 are provided as input to the convert block 25. This block is similar in function to the block 22 but is composed of PNP transistors. Thus, at output terminal 34 appears the inverse of the signal provided at its input while at output terminal 33 is provided the in-phase indication. As will be discussed hereinafter, a positive output (logical "1") at terminal 33 indicates that a carry signal has been generated in the adder while a positive signal at terminal 34 indicates that no carry has been generated. The common output of blocks 23 and 24 is brought out to output terminal 32 where a positive signal level (logical "1") will indicate that a sum has been generated in the circuit.

Figure 5:
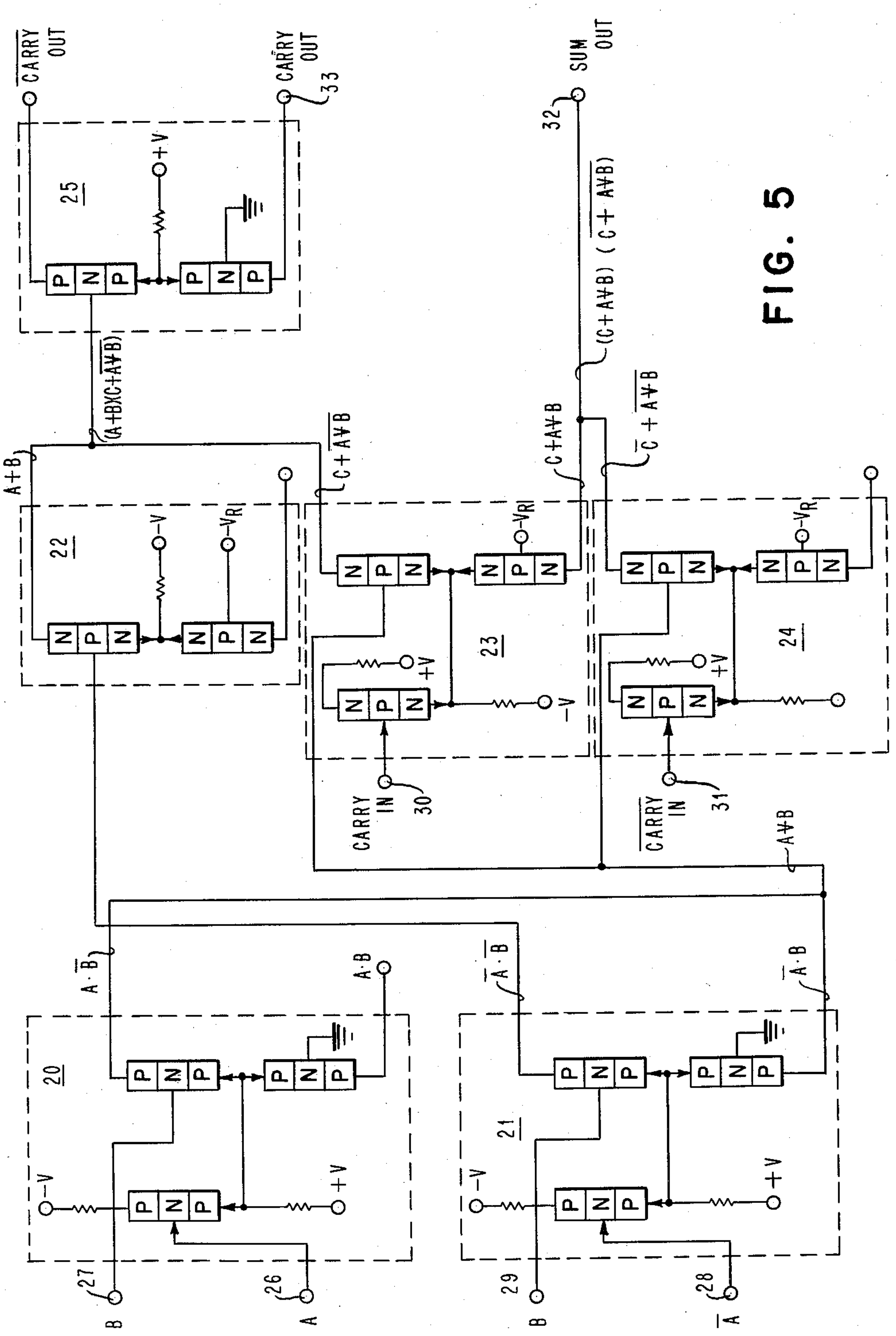
FIGURE 5 is a schematic circuit diagram of the adder illustrated in FIG. 4.

In FIG. 5 there is shown in schematic form the full adder forming part of this invention. Individual circuit groups are labeled in accordance with the block diagram of FIG. 4. For simplification, individual bias networks for each of the transistor collectors have been omitted from the drawing in FIG. 5. It will be appreciated however, that such networks will be provided at each transistor output as discussed in connection with FIGS. 1 and 2 above.

The logic blocks 20 and 21 are AND blocks of the N type such as shown in FIG. 2. To the input terminals 26 and 27 are applied respectively the A and B inputs, indicative of the two binary digits to be added. To the terminals 28 and 29 are applied respectively the $\overline{A}$ and B signals. As is indicated by the arrowheads affixed to the input leads, the A and $\overline{A}$ signals are the inhibit or third level type. Referring to the discussion of the operation of FIG. 2 for the details, it can be seen that the upper output of block 20 gives the $A\cdot\overline{B}$ function while the lower terminal gives the $A\cdot B$ output. In like manner, the upper output terminal of block 21 gives the $\overline{A}\cdot\overline{B}$ output while the $\overline{A}\cdot B$ output is present at its lower terminal. Inspection of these four outputs reveals that the upper terminal of block 20 and the lower terminal of block 21 provide the individual terms of the Exclusive OR function of A and B. The characteristics of the N type block allows these two terminals to be connected together to give the OR function directly. That the OR function can be achieved simply by connecting the wires together will be clear upon consideration of the operation of the N type of block. As described hereinabove, upon conduction of a transistor of the PNP type its collector voltage tends to rise. Since the conductivity of the transistor will control its collector potential, any other voltage connected to the collector point will not affect the collector potential of the conducting transistor. Thus, if the collector of another non-conducting transistor is connected directly to the collector of a conducting transistor, the common point will be at the positive level determined by the conducting transistor. This will be true regardless of which of the transistors having their collectors in common is conducting. This means of achieving the OR function is sometimes called a "wired" OR. With respect to the blocks 20 and 21, it is evident that the outputs that are commoned are mutually exclusive, the functions being performed requiring that only one of the two outputs can be positive at one time. By tying the two outputs together, the output line will be positive or a logical "1" only when one of the two outputs are present. This defines the Exclusive OR logical function, $A \veebar B$.

It is believed evident from the above discussion, that if the lower output of block 20 is connected with the upper output of block 21, the logical function formed will be the complement of the Exclusive OR; in Boolean notation $\overline{A \veebar B}$. Thus the logic circuit comprising blocks 20 and 21 can provide both the Exclusive OR function and its complement without additional components or delay. It will also be noted that if the logical network feeding this circuit generates the $\overline{B}$ signal rather than the B, the former may be directly substituted for the latter, requiring only that outputs be interchanged to provide the $A \veebar B$ outputs.

Should neither an A nor a B input be present, a "1" will be generated at the upper output terminal of block 21. This output is supplied to the upper transistor of convert block 22, which as discussed hereinabove, is merely a NPN version of the basic logical block of FIG. 1 with the transistor 2 eliminated. Should a "1" be present at this output, the upper transistor of block 22 is rendered conductive, thereby lowering the voltage at its output line. The output is then the inverse of the input signal. If either A or B is present at the input to the adder, then the upper output of block 21 will be at a logical "0." This in turn produces a positive output at the upper terminal of block 22 signifying the $A+B$ logical function. The block 22 is therefore a convert block, providing an inverted output at its upper output terminal at a reference level to properly drive an N type logical block. Its lower output merely provides the same indication as applied to its input but at the N reference level. In the instant circuit, this output is not used.

Logic blocks 23 and 24 are NPN versions of the block described in connection with FIG. 2. In the PNP version, it was seen that conduction of the block produced a rise in voltage level at the transistor collector, signifying a "1" output. This enabled an AND function to be performed. In the NPN version, however, the inverse is true. Conduction of the transistor produces a negative voltage change at the collector signifying a logical "0." The result of this inversion is that an OR function is produced at the outputs of the block.

The $A \veebar B$ output of blocks 20 and 21 is applied similarly to both blocks 23 and 24. An input signifying a carry when a logical "1" is applied at input terminal 30 to block 23. Similarly a logical "1" is applied to input terminal 31 of block 24 when the absence of a carry is the indication received from the previous stage. Both the carry and not-carry inputs are at the third or inhibit voltage level. As can be seen by inspection of block 23, should a positive input or a carry be applied at terminal 30, its associated transistor will be conducting thereby precluding conduction of either of the remaining two transistors of the block. Thus, a positive output at either of the two output lines of block 23 could signify that a carry or C was present at the third level input. Should no carry be present, i.e., a logical "0" be applied at terminal 30, then the upper output will be at a positive level only if there is no $A \veebar B$ being applied to its input. The upper output then gives the complete logical function $C+\overline{A \veebar B}$. Conversely, the lower output will be positive when the $A \veebar B$ input is at its logical "1" level, giving the $C+A \veebar B$ output. Similar operation is effected in block 24 except that the input at terminal 31 is a "1" when no carry is present. This gives functions similar to that of block 23 except that the first term of each output will be a $\overline{C}$. The output of the lower transistor of block 24 is not used in the adder.

It was seen above that the common connection of the outputs of two transistors of a N type block produced an OR function. This was predicated on the fact that the transistor in conduction controlled the level at its common collector point. The same effect is present when the collectors of two NPN type transistors are commoned; the potential of the conducting transistor determining the common output level. In this case, however, the conducting transistor will have a negative potential. Therefore, to produce an output at a positive level, indicative of a logical "1," at the common output of two NPN transistors requires that both of these transistors be in their Off or non-conducting condition. Since the common output will be positive or logical "1" only when each of the inputs connected to a common line are at their positive level or logical "1's," this connection performs a wired AND function.

This effect is used in the adder of FIG. 5. As shown the upper output of block 22 is ANDed with the upper output of block 23 providing a positive indication at the input to block 25 only when the designated logical function has been fulfilled. Similarly the lower output of block 23 is ANDed with the upper output of block 24 producing a positive indication at the common line only when the ascribed logical function is present. This latter output, when expanded in accordance with standard Boolean algebra techniques, produces the sum output of the adder. Thus, a positive output will be present at terminal 32 when the input conditions of the signals A and B and the carry are such as to require a sum out.

The common output of blocks 22 and 23 is applied as the input to the convert block 25. This block is similar in operation to the block 22 but since it is fabricated of PNP transistors, the levels of its output will be different. However, at terminal 34 will appear the inverse of the input signal while at terminal 33 will appear the in-phase version. As will be apparent from Boolean algebraic expansion of the logical input function, the outputs at terminals 33 and 34 will be indicative of the carry and not carry, respectively, generated by the circuit.

From consideration of the above described circuit, it will be seen that there has been fabricated a novel binary full adder circuit comprised of a minimum number of components and requiring but three levels of logical delay to complete the full addition function. As part of this adder there is described a novel Exclusive OR circuit requiring one level of delay to produce its function. The savings in components is effected through the use of the third level or inhibit operation of the circuit whereby the logical functions of the individual logic blocks are so changed as to provide more powerful circuitry. In addition to performing the full addition function, the circuit provides the $A \cdot B$ and $A \veebar B$ outputs for use as part of the "Carry look-ahead" feature used in chains of serial addition. In this connection, it is noted that the coupling networks provided at the outputs of block 25 and the sum output preferably would be of the type to provide the third level signals. This would permit the block to directly drive a similar full adder in the next stage of addition.

As noted at the beginning of the above description, for purposes of illustration a positive logic convention was adopted. This defined the logical "1" and "0" as being the positive and negative signal level, respectively. It is apparent that a negative logic convention may be adopted if desired. In that case, the more negative voltage level would signify the logical "1" and the positive level the logical "0." The basic N block performs an $\overline{\text{OR}}$ function and the P block the AND function in the negative logic convention. The complete full adder may thus be adapted to operate with negative logic by merely revising the transistor types and voltage polarities shown in FIG. 5. The PNP block of FIG. 2 may then be characterized as a "positive" AND or a "negative" OR and the NPN block similarly as a "negative" AND or a "positive" OR.

In the description of FIG. 2, it was indicated that the logical power of the basic block shown in the drawing could be increased by providing additional transistors in parallel with the transistors 1 and 2. In such an arrangement, additional third level inputs may be supplied as well as additional normal level inputs. An example of the use of this expanded logical power to effect minimization of circuitry is disclosed in application Serial No. 22,179 of the present inventor, entitled "Decoding Circuit," assigned to the present assignee and filed concurrently herewith and now Patent No. 2,994,852.

A still further increase in logical power of the circuit of FIG. 2 may be achieved by varying the mode of operation of the transistor 3. In the circuitry described hereinabove, the base 3*b* of the transistor is connected to a constant reference potential. This transistor is thus rendered conductive only when none of the other transistors of the block are conductive. If however, an additional source of input signals is coupled to the transistor 3, its conductivity may be varied to change the resultant output of the block. For example, the input signals may be so arranged that in one condition the transistor will be biased at reference level whereby it operates as described ductive to the exclusion of transistor 2. As will be appreciated, the input signal may be varied to provide a number of different operating conditions.

Although the circuit has been described utilizing transistors of the junction variety, it is to be understood that other types of transistors as well as other logic elements may be used.

While the invention has been particularly shown and described with reference to a preferred embodiment thereof, it will be understood by those skilled in the art that various changes in form and detail may be made therein without departing from the spirit and scope of the invention.

What is claimed is:

1. A logical block comprising, a constant current source, first, second and third transistors, each having emitter, base, and collector elements, means connecting all of said emitters to said constant current source, means for applying an input signal to the base of said first transistor, said input signal varying between a first voltage level at which said transistor is non-conducting and a second voltage level at which said transistor is conducting, means for applying an input signal to the base of said second transistor, said signal varying between said first voltage level at which said second transistor is cut off and a third voltage level which tends to render said transistor more conductive than said second voltage level, means coupling the base of said third transistor to a fixed voltage level at which said third transistor will be rendered conductive when both said first and second transistors are rendered non-conductive, and means to derive an output from said first and third transistors.

2. A logical block comprising, a constant current source, a plurality of transistors, each having emitter, base, and collector elements, means connecting all of said emitters to said constant current source, means for applying an input signal to the base of at least one of said transistors, said input signal varying between a first voltage level at which said transistor is non-conducting and a second voltage level at which said transistor is conducting, means for applying an input signal to the base of at least one other of said transistors, said signal varying between said first voltage level at which said second transistor is cut off and a third voltage level which tends to render said transistor more conductive than said second voltage level, means coupling the base of a third of said transistors to a fixed voltage level at which said third transistor will be rendered conductive when both said first and second transistors are rendered non-conductive, and means to derive an output from said first and third transistors.

3. A logical block comprising, a source of constant current, a plurality of transistors each having emitter, base and collector electrodes and whose emitter elements are connected to said source, each of said transistors being adapted to conduct said current to the exclusion of the others when suitably biased, a source of fixed bias potential connected to the base element of a first of said transistors, a variable potential source connected to a second of said transistors varying between a first voltage level at which said second transistor is rendered non-conductive and a second voltage level at which said second transistor is rendered conductive to the exclusion of said first transistor, a variable potential source connected to a third of said transistors varying between a first voltage level at which said third transistor is rendered non-conductive and a second voltage level at which said third transistor is rendered conductive to the exclusion of said first and second transistors, said fixed bias being of a voltage level at which said first transistor is rendered conductive when both said second and third transistors are rendered non-conductive, and means to derive output signals from said transistors.

4. The logical block of claim 3 wherein at least one other of said transistors is controlled by a variable potential source varying between substantially the same voltage levels as that applied to said second transistor and at least a further one of said transistors is controlled by a variable potential source varying between substantially the same voltage levels as that applied to said third transistor.

5. A circuit for indicating the Exclusive OR logical function of two input signals comprising, a pair of similar logical blocks, each of which has first and second input terminals, first and second output terminals and which will provide a binary "1" indication at said first output terminal when a binary "1" and a binary "0" are applied to said first and second input terminals, respectively, and a binary "1" at said second output terminal when binary "1's" are applied to both said input terminals, all other combinations of input signals providing binary "0's" at both said output terminals, means for applying one of said input signals to said first input terminal of one of said blocks, means for applying the complement of said one of said input signals to said first input terminal of the other of said blocks, means for applying the other of said input signals to said second input terminals of both of said blocks, and means directly connecting said first output terminal of said one block to the second output terminal of said other block to provide the Exclusive OR function of said two input signals.

6. A logical circuit for indicating the Exclusive OR function of two input conditions, comprising, a pair of similar logical blocks, each including a source of constant current, first, second and third transistors having emitter, base, and collector elements, means connecting all of said emitters to said current source, means for applying an input signal representative of one of said two conditions to the base of each of said first transistors, said input signal varying between a first level indicative of a logical "1" at which said transistors are in a first conductivity state and a second level indicative of a logical "0" at which said transistors are in a second conductivity state, means for applying a signal representative of the second of said two conditions to the base of said second transistor of one of said blocks, a logical "1" signifying the presence of said condition, means for applying a signal representative of the second of said two conditions to the base of said second transistor of the other of said block, a logical "1" signifying the absence of said condition, the signals representative of said second condition varying between said first level at which both said second transistors are in their first conductivity states and a third level at which said second transistors are in their second conductivity states wherein said respective first and third transistors are prevented from assuming their second conductivity states, means applying a fixed level to said third transistors at which said third transistors will assume their second conductivity state only when said respective first and second transistors are in their first conductivity state, means deriving an output from each of said transistors, and means connecting the output of said first transistor of said one of said blocks to the output of said third transistor of said other of said blocks, a logical "1" at the common connection indicating the presence of the Exclusive OR function.

7. A logical circuit for indicating the Exclusive OR function of two input signals A and B comprising, a pair of similar logical blocks, each including a source of constant current, first, second, and third transistors having emitter, base, and collector elements, means connecting all of said emitters to said current source, means for applying said B signal to the base of each of said first transistors, said B signal varying between a first voltage level indicative of a logical "1" at which said first transistors are non-conductive and a second voltage level indicative of a logical "0" at which said first transistors may be rendered conductive, means for applying said A signal to the base of said second transistor of one of said blocks, said A signal varying between said first level indicative of a logical "1" at which said second transistor is rendered non-conductive and a third level indicative of a logical "0" at which said second transistor is rendered conductive to the exclusion of said first and third transistors of said one block, means for applying the complement of said A signal to the base of said second transistor of the other of said blocks, said complement varying between said first voltage level indicative of a logical "1" at which said second transistor is rendered non-conductive and said third level indicative of a logical "0" at which said second transistor is rendered conductive to the exclusion of said first and third transistors of said other block, and means connecting the output of said first transistor of said one of said blocks to the output of said third transistor of said other of said blocks, a logical "1" at said common connection indicating the presence of the Exclusive OR function of said A and B signals.

8. A full adder for providing sum and carry outputs resulting from the binary addition of first, second and third binary digits comprising, first circuit means for producing outputs indicative of both the OR and Exclusive OR logical functions of said first and second digits, second circuit means for producing outputs indicative of the OR functions of said third digit with said Exclusive OR output and with the complement of said Exclusive OR output respectively, third circuit means for producing an output indicative of the OR function of the complement of said third digit and the complement of said Exclusive OR output, means for producing the AND function of the first-named output of said second circuit means and the output of said third circuit means to produce the sum indication, and means for producing the AND function of the OR output of said first circuit means and the second-named output of said second circuit means to provide the carry indication.

9. The full adder of claim 8 above wherein each of said circuit means comprises, a constant current source, first, second and third transistors, each having emitter, base, and collector elements, means connecting all of said emitters to said constant current source, means for applying an input signal to the base of said first transistor, said input signal varying between a first voltage level at which said transistor is non-conducting and a second voltage level at which said transistor is conducting, means for applying an input signal to the base of said second transistor, said signal varying between said first voltage level at which said second transistor is cut off and a third voltage level which tends to render said transistor more conductive than said second voltage level, means coupling the base of said third transistor to a fixed voltage level at which said third transistor will be rendered conductive when both said first and second transistors are rendered non-conductive, and means to derive an output from said first and third transistors.

10. The full adder of claim 9 above wherein the transistors of said first circuit means are of one conductivity type and the transistors of said second and third circuit means are of the opposite conductivity type.

11. The full adder of claim 8 above wherein said first circuit means comprises, a pair of similar logical blocks, each of which has first and second input terminals, first and second output terminals and which will provide a binary "1" indication at said first output terminal when a binary "1" and a binary "0" are applied to said first and second input terminals respectively, and a binary "1" at said second output terminal when binary "1's" are applied to both said input terminals, all other combinations of input signals providing binary "0's" at both said output terminals, means for applying a signal representing said first digit to said first input terminal of one of said blocks, means for applying a signal representing the complement of said first digit to said first input terminal of the other of said blocks, means for applying a signal representing said second digit to said second input terminals of both of said blocks, means directly connecting said first output terminal of said one block to the second output terminal of said other block to provide the Exclusive OR function of said first and second digits, and means for inverting the output at said first output terminal of said second block to provide the OR function of said first and second digits.

12. A logical circuit having first and second input terminals for receiving signals at levels indicative of a binary "1" or binary "0" to produce binary coded output signals at first and second output terminals, comprising first, second and third transistors having emitter, base and collector elements, a constant current source coupled to the emitter elements of said transistors, the base elements of said first and second transistors being coupled to the first and second input terminals respectively and the base element of said third transistor being coupled to a source of reference potential only, and said first and second output terminals being coupled to the collector elements of said second and third transistors respectively, enabling a binary "1" indication to be provided at said first output terminal only when binary "1" and binary "0" indications are applied to said first and second input terminals respectively, and enabling a binary "1" indication to be provided at said second output terminal only when binary "1" indications are applied to both said input terminals.

References Cited in the file of this patent

UNITED STATES PATENTS

| | | |
|---|---|---|
| 2,870,348 | Chao | Jan. 20, 1959 |
| 2,898,479 | McElroy | Aug. 4, 1959 |
| 2,930,530 | Saxby et al. | Mar. 29, 1960 |
| 2,966,305 | Rosenberger | Dec. 27, 1960 |
| 2,971,696 | Henle | Feb. 14, 1961 |
| 3,015,734 | Jones | Jan. 2, 1962 |

OTHER REFERENCES

Richards: Arithmetic Operations in Digital Computers, D. Van Nostrand and Co., Inc., Princeton, New Jersey, March 17, 1955, pages 91–93.